UNITED STATES PATENT OFFICE.

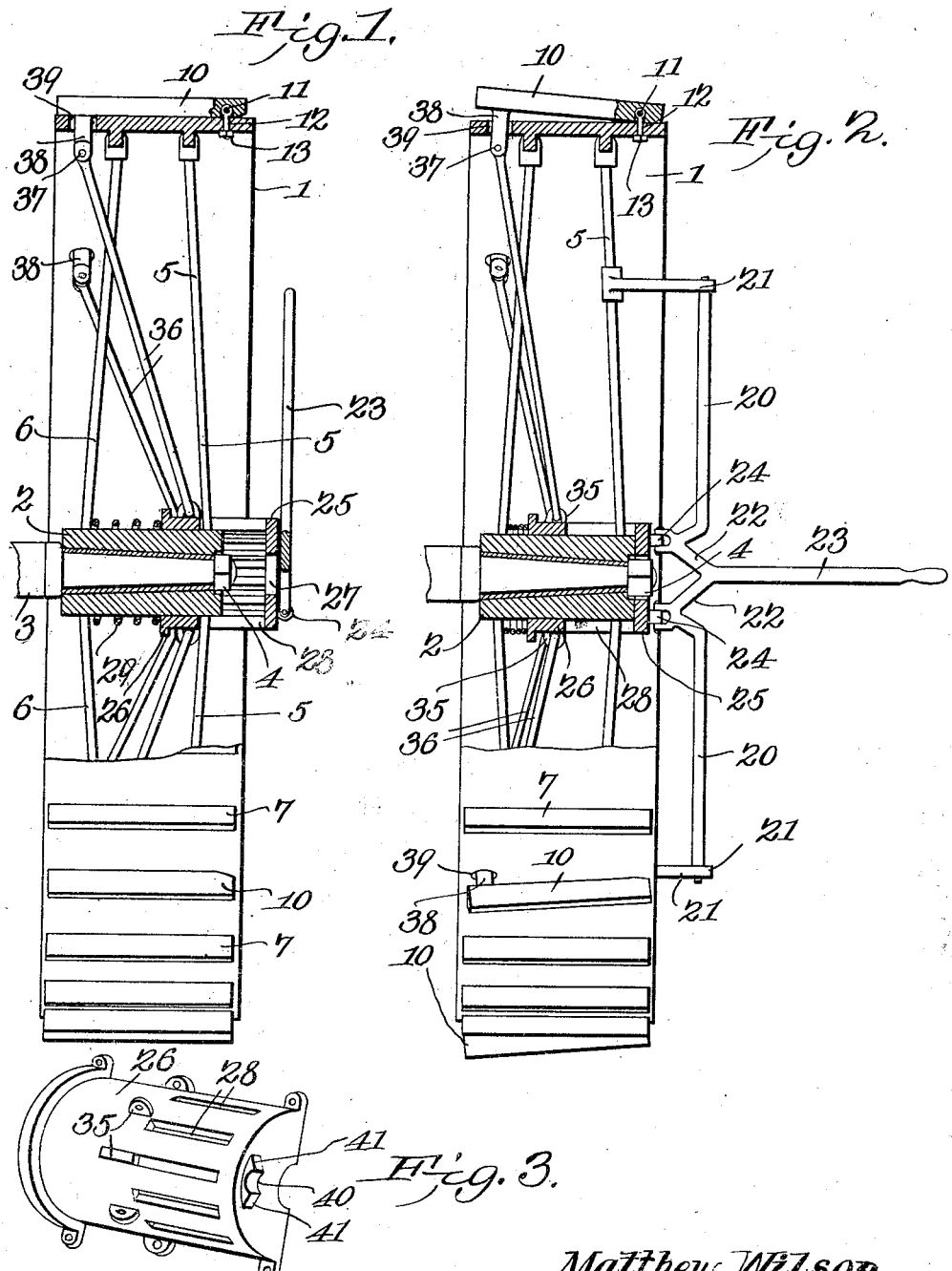

MATTHEW WILSON, OF GARRISON, IOWA.

TRACTION-WHEEL.

No. 877,152.

Specification of Letters Patent.

Patented Jan. 21, 1908.

Application filed June 18, 1906. Serial No. 322,294.

*To all whom it may concern:*

Be it known that I, MATTHEW WILSON, a citizen of the United States, residing at Garrison, in the county of Benton and State of Iowa, have invented a new and useful Traction-Wheel, of which the following is a specification.

This invention relates to traction wheels such as are provided with mud-hook attachments.

The object of the invention is to provide a traction wheel having adjustable mud-hooks and improved operating mechanism for the mud-hooks carried entirely by the traction wheel and having no connection whatever with the body of the traction engine or other vehicle.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of the following claims without departing from the spirit of the invention or sacrificing any of its advantages.

In the accompanying drawings forming part of this specification: Figure 1 is a sectional view, partly in elevation, of a traction wheel equipped with the improvements of the present invention. Fig. 2 is a view similar to Fig. 1 but taken at a right angle thereto. Fig. 3 is a perspective view showing one-half of the slidable sleeve.

Like reference numerals indicate corresponding parts in the different figures of the drawings.

The traction wheel in connection with which the improvements of the present invention are used, can be of any suitable form and construction. One convenient form of traction wheel has been illustrated in the drawing as consisting of an outer rim or periphery 1, the hub 2 mounted on the axle 3 and held in position by the nut or other suitable device 4 and the spaced sets of spokes 5 and 6. The traction wheel can be provided on its periphery, if desired, with a plurality of fixed mud-hooks 7.

In carrying out the present invention, the rim 1 of the wheel is provided with a plurality of adjustable mud-hooks 10. While the mud-hooks 10 may be adjustably mounted in any suitable manner, said hooks preferably are pivotally connected at one end, as indicated at 11, with a bolt or other suitable device 12 which extends through the rim 1 and is provided with a nut 13, the bolt 12 serving as means for pivotally connecting the mud-hook with the rim of the wheel.

The preferred mechanism, which is carried entirely by the traction wheel, for operating the adjustable mud-hooks 10, consists of a shaft 20 which is suitably journaled upon the wheel by means of the arms 21 which are connected with the spokes or other suitable portions of the wheel. The shaft 20 is bent to form a pair of approximately V-shaped crank portions 22, the meeting ends of which are connected with a handle or controlling lever 23. The V-shaped crank portions 22 are each provided with a suitable anti-friction roller 24, which rollers are adapted to bear against the outer end 25 of a sleeve 26 which is mounted for longitudinal sliding movement upon the hub 2. While the sleeve 26 may be of any suitable form and construction, said sleeve preferably is formed in two halves which are suitably bolted together. The outer end 25 of the sleeve 26 is formed with a central opening 27 to fit around the nut 4. The sleeve 26 is formed with a plurality of longitudinally extending spoke slots 28 through which extend the outer set of spokes 5, as shown clearly in the drawing. Surrounding the hub 2 is a coil spring 29 which bears at its inner end against the spokes 6, and at its outer end against the sleeve 26, thus constituting automatic means for moving the sleeve 26 outwardly. The sleeve 26 is provided around its periphery with a plurality of ears or lugs 35 with which are connected links 36 the outer ends of which are pivotally connected at 37 with arms 38 secured to or formed integral with the adjustable mud-hooks 10 and projecting inward through suitable perforations 39 in the rim 1 of the wheel.

Constructed as described, the operation of the improved mechanism is as follows: When the operating lever 23 is in the position shown in Fig. 1, that is, when it is in approximate parallelism with the adjacent spoke 5, the sleeve 26 is forced outward on the hub in an automatic manner by the coil spring 29, and the free or inner ends of the adjustable mud-hooks 10 are drawn inward against the rim of the traction wheel, as shown in Fig. 1. If it be desired to extend the adjustable mud-hooks, so that they will take a deeper grip in the ground, the controlling lever 23 is grasped, while the traction engine is standing still, and drawn outward to the position shown in Fig. 2, so that it is approximately parallel with the axle 3. When the controlling lever 23 is operated, the anti-friction rollers 24 move across the outer face or end 25 of the sleeve 26, thus forcing said sleeve inward upon the hub 2 against the tension of the coil spring 29, as shown clearly in Fig. 2, whereby the links 36 cause the inner ends of the mud-hooks 10 to be moved outward as shown in Fig. 2, so as to take a firmer grip in the ground or surface over which the traction wheel is moving.

In order to provide means for locking the controlling lever 23 in the position shown in Fig. 2, I mount upon the outer end 25 of the sleeve 26 a pair of approximately semi-cylindrical socket pieces 40 having beveled ends 41 up which the anti-friction rollers 24 will move until they snap into the socket portions 40 and are thus held in position by the action of the coil spring 29 which forces the sleeve 26 outward.

From the foregoing description it will be apparent that the operating mechanism for the adjustable mud-hooks 10 is carried entirely by the traction wheel, whereby the necessity of providing operating mechanism carried by the traction engine and connected intermediately with the traction wheel, is avoided.

The improved device of this invention is strong, simple, durable and inexpensive in construction as well as thoroughly efficient in operation.

What is claimed is:

1. A traction wheel having adjustable mud-hooks, a sleeve movable axially on the hub of said wheel, stiff connections between said sleeve and said mud-hooks and means for sliding said sleeve mounted on said wheel.

2. A traction wheel having adjustable mud-hooks, a sleeve movable axially on the hub of said wheel, stiff connections between said sleeve and said mud-hooks, and a lever journaled on said wheel and moving said sleeve.

3. In a traction wheel, mud-hooks pivoted at one end to the rim of said wheel, a sleeve slidable axially on the hub thereof, connections between said sleeve and the free ends of said mud-hooks, manual means for moving the sleeve in one direction, and automatic means for sliding it in the opposite direction.

4. In a traction wheel, mud-hooks pivoted at one end to the rim of said wheel, a sleeve slidable axially on the hub thereof, connections between said sleeve and the free ends of said mud-hooks, manual means for moving the sleeve inwardly to protect the mud-hooks, automatic means for sliding said sleeve outwardly to retract said hooks, and means for locking the sleeve in its inner position.

5. A traction wheel having a plurality of mud-hooks pivotally connected therewith, a slidable sleeve on the hub of said wheel, links connecting said sleeve with said mud-hooks, automatic means for moving said sleeve outward, a shaft journaled on said wheel and having V-shaped crank portions, anti-friction rollers carried by said crank portions and bearing against the end of said sleeve, locking means carried by said sleeve for engaging said rollers and holding them in central position, and a controlling lever connected with said shaft.

In testimony that I claim the foregoing as my own, I have hereto affixed my signature in the presence of two witnesses.

MATTHEW WILSON

Witnesses:
VERNON H. WILSON,
F. M. SPRINGSTEEN.